US011043778B2

(12) United States Patent
Cipully

(10) Patent No.: US 11,043,778 B2
(45) Date of Patent: Jun. 22, 2021

(54) VAPE CARTRIDGE CELL PHONE POWER ADAPTER

(71) Applicant: Taylor Cipully, Danbury, CT (US)

(72) Inventor: Taylor Cipully, Danbury, CT (US)

( * ) Notice: Subject to any disclaimer, the term of this patent is extended or adjusted under 35 U.S.C. 154(b) by 0 days.

(21) Appl. No.: 16/365,470

(22) Filed: Mar. 26, 2019

(65) Prior Publication Data

US 2020/0313374 A1   Oct. 1, 2020

(51) Int. Cl.
| | | |
|---|---|---|
| *H01R 31/06* | (2006.01) | |
| *A24F 47/00* | (2020.01) | |
| *H01R 13/70* | (2006.01) | |
| *H01R 13/66* | (2006.01) | |
| *H02J 7/34* | (2006.01) | |

(52) U.S. Cl.
CPC ......... *H01R 31/065* (2013.01); *A24F 47/008* (2013.01); *H01R 13/6675* (2013.01); *H01R 13/6683* (2013.01); *H01R 13/70* (2013.01); *H02J 7/342* (2020.01)

(58) Field of Classification Search
None
See application file for complete search history.

(56) References Cited

U.S. PATENT DOCUMENTS

| 8,172,580 | B1 * | 5/2012 | Chen | H01R 31/065 |
| | | | | 320/111 |
| 9,648,908 | B1 * | 5/2017 | Rinehart | A24F 47/00 |
| 9,872,520 | B1 * | 1/2018 | Elson | A24F 47/008 |
| 10,045,567 | B2 * | 8/2018 | Monsees | A24F 47/008 |
| 10,389,399 | B2 * | 8/2019 | Carnevali | H01R 31/06 |
| 2015/0366268 | A1 * | 12/2015 | Shabat | H04M 1/21 |
| | | | | 131/329 |
| 2016/0331035 | A1 * | 11/2016 | Cameron | F01K 5/00 |
| 2016/0345628 | A1 * | 12/2016 | Sabet | A24F 15/18 |
| 2017/0273358 | A1 * | 9/2017 | Batista | A24F 47/008 |
| 2017/0302324 | A1 * | 10/2017 | Stanimirovic | H01M 10/46 |
| 2017/0360090 | A1 * | 12/2017 | Grossfeld | A24F 47/008 |
| 2018/0145469 | A1 * | 5/2018 | Chung | H01R 13/7039 |
| 2018/0153219 | A1 * | 6/2018 | Verleur | A24F 47/008 |
| 2019/0015605 | A1 * | 1/2019 | Palmer | A61M 11/042 |
| 2019/0200113 | A1 * | 6/2019 | Kim | H04M 1/6058 |
| 2019/0281893 | A1 * | 9/2019 | Valdez-Gibson | A24F 15/18 |
| 2019/0313697 | A1 * | 10/2019 | Bellinger | G01N 33/0011 |
| 2019/0373952 | A1 * | 12/2019 | Todd | H02J 7/00 |
| 2020/0022414 | A1 * | 1/2020 | Leeds | A24F 40/90 |

* cited by examiner

*Primary Examiner* — Oscar C Jimenez
(74) *Attorney, Agent, or Firm* — Lyman Moulton, Esq.; Moulton Patents, PLLC

(57) ABSTRACT

A power supply adapter from a cell phone to an electronic cigarette vaporizer includes a male end adapted to connect with a cell phone charging socket, a female end adapted to connect with the electronic cigarette vaporizer cartridge, a body comprising the male end and the female end and mechanical and electrical connection there between, an electronic component adapted to regulate a voltage potential and a current flow between the male end and the female end and a sensor configured to sense a characteristic of the vaporizer cartridge and pass the characteristic to the male end of the power supply adapter. The male end is adapted to connect with one of an Apple™ phone input socket and an Android™ phone input socket. The body includes a cabled connection of a variable length between the male end and the female end of the power supply adapter.

18 Claims, 3 Drawing Sheets

VAPE CARTRIDGE CELL PHONE POWER ADAPTER

BACKGROUND OF THE INVENTION

The present invention relates to a vaporizing ecigarette and the power supply thereto. Electric cigarettes have lessened some of the harmful aspects of smoking. However, electric cigarettes require electric power where real cigarettes did not. It is this disadvantage of electrical cigarettes that is addressed by the present disclosure.

SUMMARY OF THE DISCLOSURE

A power supply adapter from a cell phone to an electronic cigarette vaporizer includes a male end adapted to connect with a cell phone charging socket, a female end adapted to connect with the electronic cigarette vaporizer cartridge, a body comprising the male end and the female end and mechanical and electrical connection there between, an electronic component adapted to regulate a voltage potential and a current flow between the male end and the female end and a sensor configured to sense a characteristic of the vaporizer cartridge and pass the characteristic to the male end of the power supply adapter. The male end is adapted to connect with one of an Apple™ phone input socket and an Android™ phone input socket. The body includes a cabled connection of a variable length between the male end and the female end of the power supply adapter.

Figure 1:
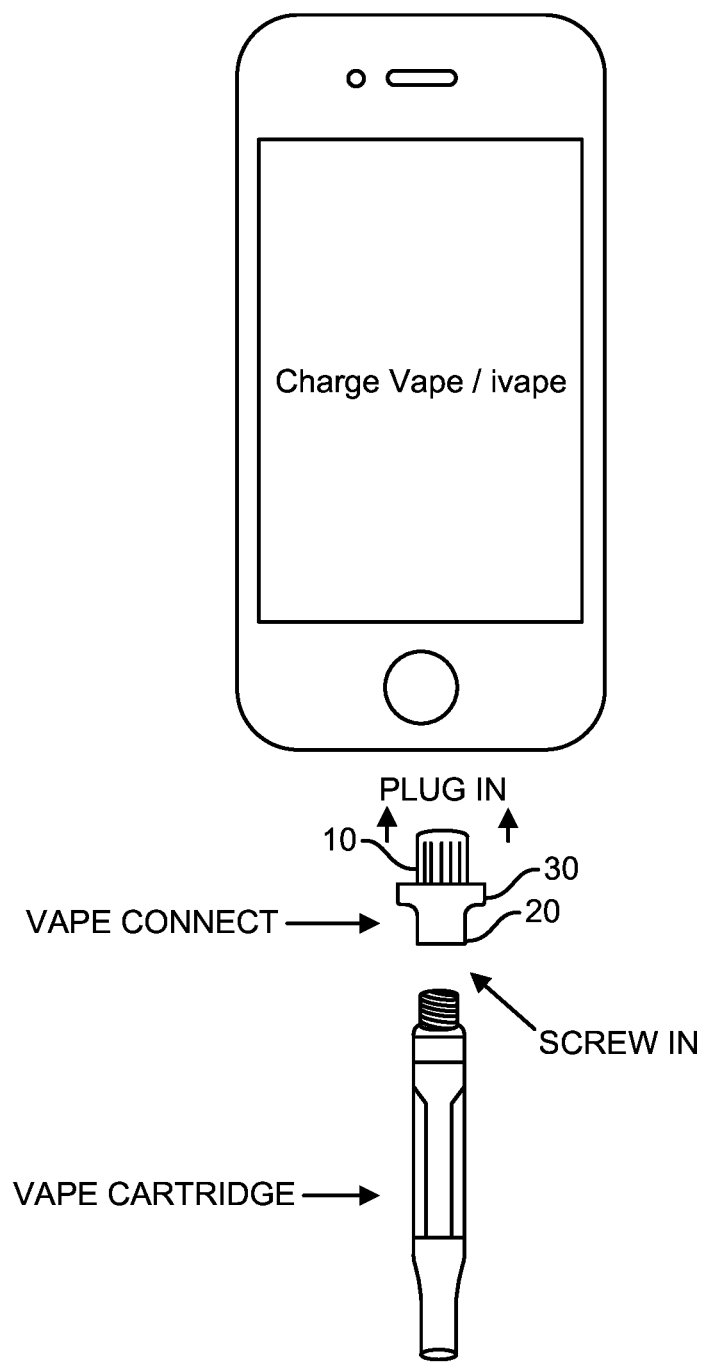
FIG. 1 depicts the cell phone to vaporizer cartridge power supply adapter in accordance with the present invention.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Throughout the present disclosure the term 'regulate' is used in the common sense to control or to maintain an electrical characteristic or property.

FIG. 1 depicts the cell phone to vaporizer cartridge power supply adapter in accordance with the present invention. The depiction includes a male end 10, a body 20 and a female end 20 as described in detail herein. Also depicted are a cell phone which receives the male end 10 and a 'vape cartridge which is received into the female end 20 by threads or other connections known in the art.

Figure 2:
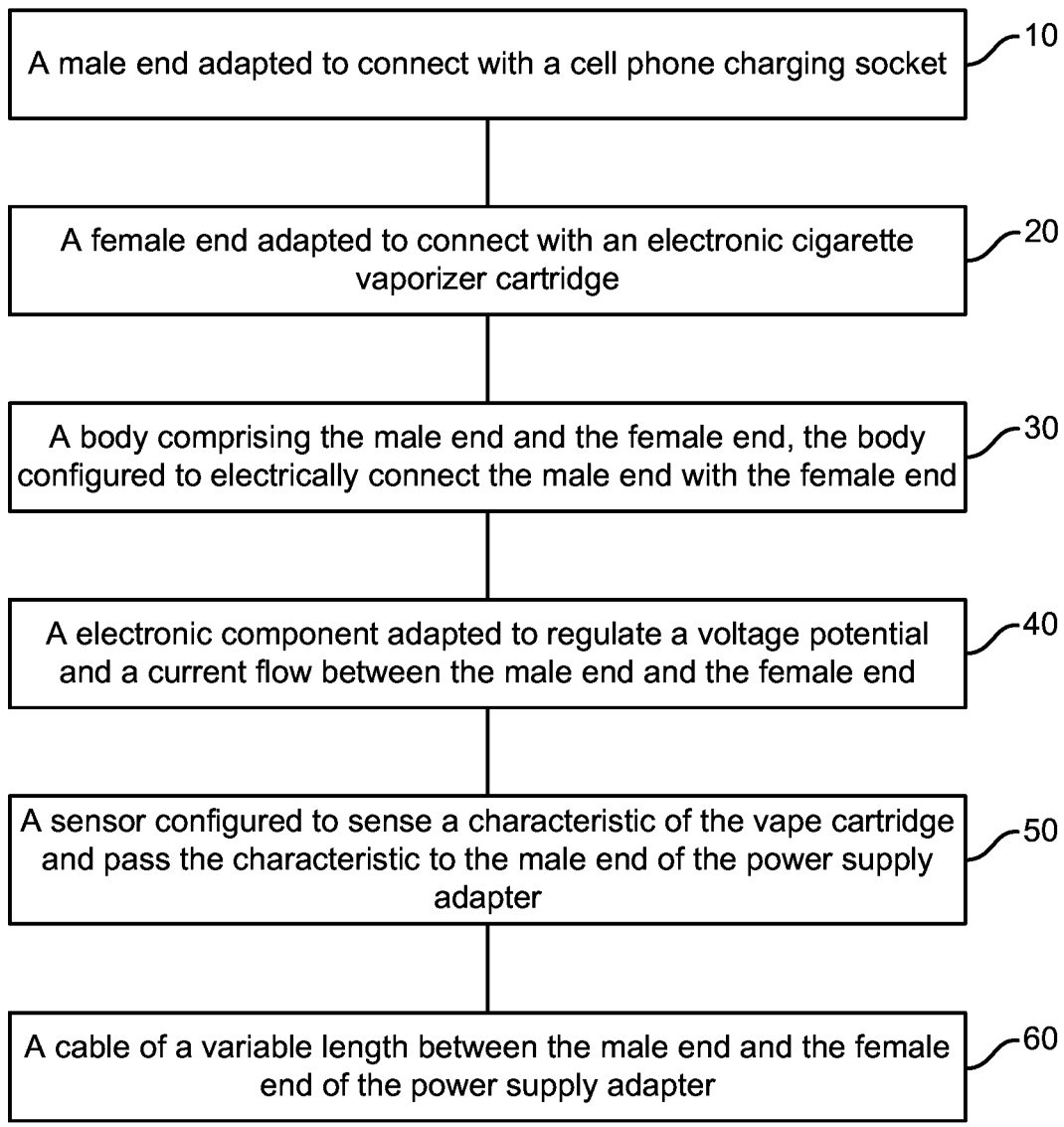
FIG. 2 depicts a block diagram of components of the cell phone to vaporizer cartridge power supply adapter in accordance with the present invention.

FIG. 2 depicts a block diagram of components of the cell phone to vaporizer cartridge power supply adapter in accordance with the present invention. The block diagram includes the male end 10, the female end 20, the body 30, the electronic component(s) 40, the sensor(s) 50 and the cable 60. The relation of these block diagram components to each other is depicted in part in FIG. 1 and in FIG. 3 herein.

Figure 3:
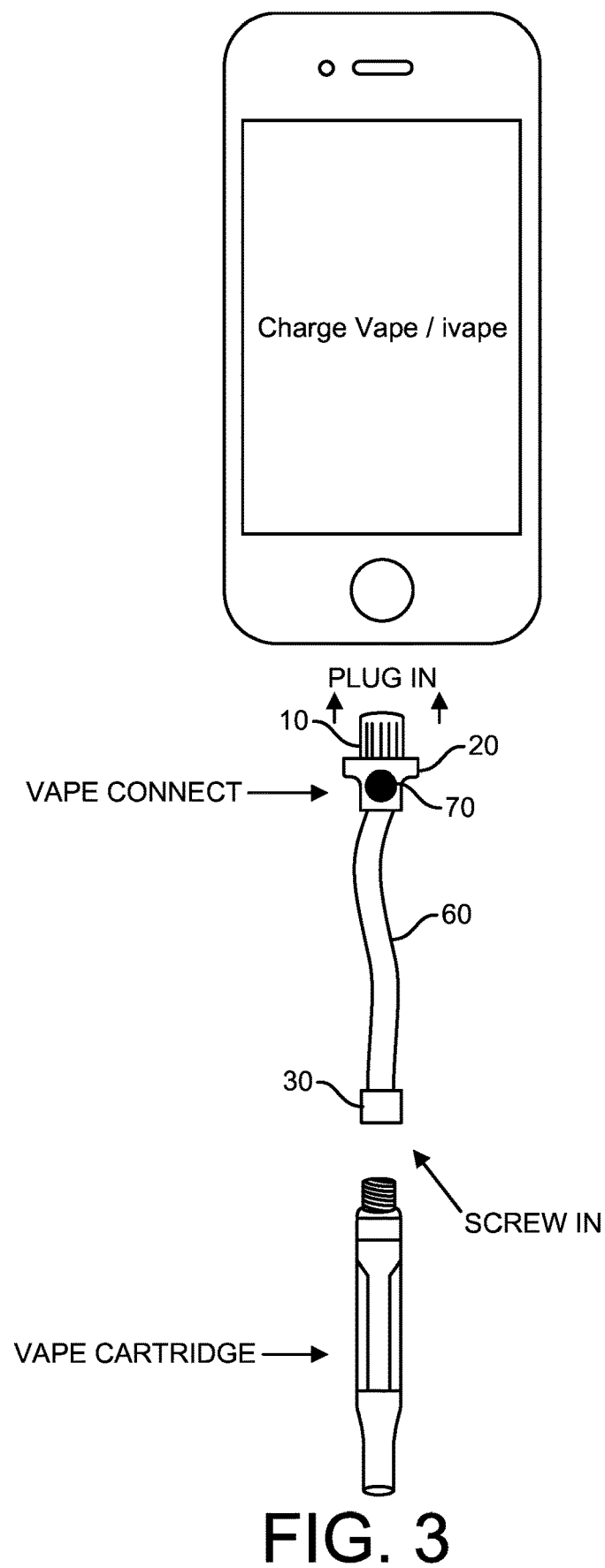
FIG. 3 depicts the cell phone to vaporizer cartridge power supply adapter with cable and toggle button in accordance with the present invention.

FIG. 3 depicts the cell phone to vaporizer cartridge power supply adapter with cable and toggle button in accordance with the present invention. Reference numbers depicted are same as reference numbers of other figures herein with the addition of the cable 60 and the distal location of the female end 30 at the second end of the cable where the first end of the cable is proximal the male end.

A power supply adapter for an electronic cigarette vaporizer cartridge includes a male end adapted to connect with a cell phone charging socket; a female end adapted to connect with the electronic cigarette vaporizer cartridge; and a body comprising the male end and the female end, the body configured to electrically connect the male end with the female end.

The power supply adapter is adapted to connect mechanically and electrically with an Apple™ phone input socket. It is also adapted to connect mechanically and electrically with an Android™ phone input socket. The female end is adapted to mechanically and electrically connect with a 510 thread of a vape cartridge. Additionally, the power supply adapter body includes a cabled connection of a variable length between the male end and the female end of the power supply adapter.

The power supply adapter for an electronic cigarette vaporizer further includes an electronic component adapted to regulate a voltage potential and a current flow between the male end and the female end. An embodiment of the electronic component is passive and passes a voltage and a current found at the male end to the female end. Another embodiment of the electronic component is active and controls a voltage and a current found at the male end to the female end. The active electronic component also controls a variable voltage at the female end of the adapter. The active electronic component also controls a variable current at the female end of the power supply adapter. The active electronic component also activates a shutdown of current from the male end to the female end of the power supply adapter.

The power supply adapter for an electronic cigarette vaporizer further includes a sensor configured to sense a characteristic of the vape cartridge and pass the characteristic to the male end of the power supply adapter. An embodiment of the disclosure further includes a toggle button on the body. The toggle button interfaces to the electronic component to specify one of a preselected voltage to pass from the male end to the female end of the power supply adapter. The toggle button also specifies one of a preselected current to pass from the male end to the female end of the power supply adapter. Embodiments further comprise an on/off toggle button on the body. The toggle button is configured to pass/open current from the male end to the female end of the power supply adapter.

Embodiments of the power supply adapter include a vaporizer cartridge sensor engineered to sense a fluid level of the vape cartridge. Another characteristic of the vape cartridge sensed by the sensor is a fluid composition of the vape cartridge. A further characteristic of the vape cartridge sensed by the sensor is a vape cartridge type.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention.

The instant invention has been shown and described in what it considers to be the most practical and preferred embodiments. It is recognized, however, that departures may be made there from within the scope of the invention and that obvious modifications will occur to a person skilled in the art.

What is claimed is:

1. A power supply adapter for an electronic cigarette vaporizer cartridge, the adapter comprising;
    a male end adapted to connect with a cell phone charging socket;
    a sensor configured to sense a fluid composition characteristic of the vape cartridge and sense a vape cartridge type and pass the fluid composition characteristic and the vape cartridge type to the male end of the power supply adapter;
    a female end adapted to connect with the electronic cigarette vaporizer cartridge, wherein the female end is adapted to mechanically and electrically connect with a 510 thread of the vape cartridge; and
    a body comprising the male end and the female end, the body configured to electrically connect the male end with the female end.

2. The power supply adapter of claim 1, wherein the male end is adapted to connect mechanically and electrically with an Apple™ phone input socket.

3. The power supply adapter of claim 1, wherein the male end is adapted to connect mechanically and electrically with an Android™ phone input socket.

4. The power supply adapter of claim 1, wherein the body of the power supply adapter comprises a cabled connection of a variable length between the male end and the female end of the power supply adapter.

5. A power supply adapter for an electronic cigarette vaporizer, the adapter comprising;
    a male end adapted to connect with a cell phone charging socket;
    a female end adapted to connect with an electronic cigarette vaporizer cartridge;
    a sensor configured to sense a type of the vape cartridge and pass the type to the male end of the power supply adapter;
    a body comprising the male end and the female end, the body configured to electrically connect the male end and the female end; and
    an electronic component adapted to regulate a voltage potential and a current flow between the male end and the female end.

6. The power supply adapter of claim 5, wherein the electronic component is passive and passes a voltage and a current found at the male end to the female end.

7. The power supply adapter of claim 5, wherein the electronic component is active and controls a voltage and a current found at the male end to the female end.

8. The power supply adapter of claim 5, wherein the electronic component is active and controls a variable voltage at the female end of the adapter.

9. The power supply adapter of claim 5, wherein the electronic component is active and controls a variable current at the female end of the power supply adapter.

10. The power supply adapter of claim 5, wherein the electronic component is active and activates a shutdown of current from the male end to the female end of the power supply adapter.

11. A power supply adapter for an electronic cigarette vaporizer, the adapter comprising;
    a male end adapted to connect with a cell phone charging socket;
    a female end adapted to connect with an electronic cigarette vaporizer cartridge;
    a body comprising the male end and the female end, the body configured to electrically connect the male end and the female end;
    an electronic component adapted to regulate a voltage potential and a current flow between the male end and the female end; and
    a sensor configured to sense a fluid composition characteristic of the vape cartridge and pass the characteristic to the male end of the power supply adapter.

12. The power supply adapter of claim 11, further comprising a toggle button on the body, the toggle button configured to interface to the electronic component to specify one of a preselected voltage to pass from the male end to the female end of the power supply adapter.

13. The power supply adapter of claim 11, further comprising a toggle button on the body, the toggle button configured to interface to the electronic component to specify one of a preselected current to pass from the male end to the female end of the power supply adapter.

14. The power supply adapter of claim 11, further comprising an on/off toggle button on the body, the toggle button configured to pass/open current from the male end to the female end of the power supply adapter.

15. The power supply adapter of claim 11, wherein the characteristic of the vape cartridge sensed by the sensor is a fluid level of the vape cartridge.

16. The power supply adapter of claim 11, wherein the characteristic of the vape cartridge sensed by the sensor is a vape cartridge type.

17. The power supply adapter of claim 11, wherein the male end is adapted to mechanically and electrically connect with one of an Apple™ phone input socket and an Android™ phone input socket.

18. The power supply adapter of claim 11, wherein the body of the power supply adapter comprises a cabled connection of a variable length between the male end and the female end of the power supply adapter.

* * * * *